US012715360B2

(12) United States Patent
Goyal et al.

(10) Patent No.: US 12,715,360 B2
(45) Date of Patent: Aug. 25, 2026

(54) SYSTEM AND METHOD FOR REARVIEW MIRROR MISALIGNMENT DETECTION

(71) Applicant: Rivian IP Holdings, LLC, Irvine, CA (US)

(72) Inventors: Dushyant Goyal, Great Neck, NY (US); Yan Zhai, Milpitas, CA (US); Vikram Vijayanbabu Appia, San Jose, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 350 days.

(21) Appl. No.: 18/240,906

(22) Filed: Aug. 31, 2023

(65) Prior Publication Data

US 2025/0074307 A1 Mar. 6, 2025

(51) Int. Cl.
*B60R 1/02* (2006.01)
*B60R 1/12* (2006.01)

(52) U.S. Cl.
CPC ................ *B60R 1/025* (2013.01); *B60R 1/12* (2013.01); *B60R 2001/1253* (2013.01); *B60R 2300/402* (2013.01); *B60R 2300/8006* (2013.01)

(58) Field of Classification Search
None
See application file for complete search history.

(56) References Cited

U.S. PATENT DOCUMENTS 9,598,015 B1 * 3/2017 Pertsel ................. G06V 20/597
2002/0048094 A1 * 4/2002 Witt .......................... B60R 1/02 359/872
2017/0158135 A1 * 6/2017 Ding ....................... B60R 11/04
2018/0178729 A1 * 6/2018 Festerling, Jr. ........ G06V 20/59
2018/0297517 A1 * 10/2018 Niemoeller ............. B60R 1/062
2018/0345867 A1 * 12/2018 Imamura .............. H04N 13/376
2019/0135181 A1 * 5/2019 King ......................... B60R 1/26
2020/0130584 A1 * 4/2020 Slama ................ B60R 11/0235
2020/0369206 A1 * 11/2020 Baltaxe ..................... B60R 1/12
2021/0229601 A1 7/2021 Hu et al.
2023/0137004 A1 * 5/2023 Huizen ..................... B60R 1/04 348/77

(Continued)

FOREIGN PATENT DOCUMENTS

KR 20190059285 A * 5/2019 ............... B60R 1/12

OTHER PUBLICATIONS

Machine translation KR-20190059285-A (Year: 2019).*

(Continued)

*Primary Examiner* — Christian Chace
*Assistant Examiner* — Scott R Jagolinzer
(74) *Attorney, Agent, or Firm* — HG Law LLP

(57) ABSTRACT

Systems and methods are presented herein for facilitating alignment of a rearview mirror for a vehicle user or driver. Example methods may include determining, using control circuitry, a location of a driver of a vehicle, identifying, using the control circuitry, a region of interest associated with the vehicle, and determining, using the control circuitry, a misalignment of the rearview mirror based on the location of the drive rand the region of interest. Additionally, the methods may comprise providing, using the control circuitry, an alert of the misalignment. Alternatively, or in addition to alerts, example methods may provide guidance to align the rearview mirror for the driver.

19 Claims, 5 Drawing Sheets

(56) References Cited

U.S. PATENT DOCUMENTS

2023/0339397 A1* 10/2023 Fleming .................... B60R 1/12
2025/0074311 A1* 3/2025 Sobecki ............... H05B 47/125

OTHER PUBLICATIONS

"How to Adjust Car Mirrors", URL:www.wikihow.com/Adjust-Car-Mirrors, retrieved on Aug. 31, 2023, dated Aug. 6, 2023.

* cited by examiner

SYSTEM AND METHOD FOR REARVIEW MIRROR MISALIGNMENT DETECTION

INTRODUCTION

Rearview mirrors are provided in vehicles to provide a driver or vehicle operator with a view rearward of the vehicle while reducing the need for the driver to turn their head to do so. Generally, a driver adjusts positioning of the rear-view mirror(s) to have clear visibility of the road and minimize any potential blind spots.

SUMMARY

The present disclosure is directed to methods and systems for providing a view rearward of a vehicle, and more particularly to detecting misalignment of a rearview mirror. Rearview mirrors are provided in vehicles to provide a driver or vehicle operator with a view rearward of the vehicle while reducing the need for the driver to turn their head to do so. Generally, a driver adjusts positioning of the rear-view mirror(s) to have clear visibility of the road and minimize any potential blind spots. Rearview mirrors, such as inside rearview mirrors, are typically positioned/repositioned manually by the driver so that they can see directly out of the middle of the back windshield without have to move their head from a position typical for driving the vehicle. In this manner, the driver may quickly glance from their view ahead of the vehicle through the windshield to the road behind without having to move or turn their body.

Known rearview mirror systems generally require a driver or vehicle operator to proactively monitor mirror alignment and to manually position the mirror properly. A rearview mirror that becomes misaligned during vehicle operation may not be noticed until the driver needs the use of the rearview mirror. Additionally, alignment of the mirror generally requires relatively fine mirror movements, making manual adjustments somewhat difficult, particularly so while the vehicle is being driven.

Accordingly, in at least some example approaches herein, a method is provided comprising determining, using control circuitry, a location of a driver of a vehicle. The method further comprises identifying, using the control circuitry, a region of interest associated with the vehicle and determining, using the control circuitry, a misalignment of the rearview mirror based on the location of the driver and the region of interest. Additionally, the method comprises providing, using the control circuitry, an alert of the misalignment.

In at least some example approaches, a method identifies the region of interest based on an orientation of the mirror.

In at least a subset of the above examples, a method also comprises determining the orientation of the rearview mirror based on an image taken by a camera coupled to the rearview mirror and a vehicle reference location.

In at least some of the above example methods, the region of interest is identified based on the orientation of the rearview mirror relative to one or more vehicle reference locations spaced away from the rearview mirror.

In at least some example illustrations, the region of interest is identified based on the orientation of the rearview mirror relative to one or more reference locations having a fixed position relative to a mount of the rearview mirror, the one or more reference locations spaced away from the rearview mirror.

In at least some examples, a method also comprises providing a visual guidance to the driver to align the rearview mirror based on the misalignment. For example, a visual reference may include a representation of a vehicle feature.

In at least some example illustrations of a method, the location of the driver is determined from one or more facial features of the driver.

In at least some examples, the location of the driver defines a bounding box having a minimum area enclosing one or more facial features of the driver.

In at least some example methods, the misalignment of the rearview mirror is determined by comparing the location of the driver with the region of interest in response to a driver movement.

In at least some example methods, the location of the driver is determined from a camera mounted to the rearview mirror.

In at least some examples, the alert includes one of a sound and a visual alert provided away from the reflective surface.

According to another example illustration, a method comprises determining, using control circuitry, a location of a driver of a vehicle. The method also includes identifying, using the control circuitry, a region of interest associated with the vehicle and determining, using the control circuitry, a misalignment of the rearview mirror based on the location of the driver and the region of interest. The method further includes providing, using control circuitry, a visual guidance to the driver to align the rearview mirror based on the misalignment.

In at least some example illustrations, the method identifies the region of interest by identifying the region of interest based on an orientation of the rearview mirror and determining the orientation of the rearview mirror based on an image taken by a camera coupled to the rearview mirror and a vehicle reference location. In at least some example illustrations, the visual guidance includes a visual reference of an aligned position of the rearview mirror. For example, the visual reference may include a representation of a vehicle feature.

According to another example illustration, a vehicle system is provided that comprises a rearview mirror. The vehicle system also comprises control circuitry configured to determine a location of a driver of a vehicle, identify a region of interest associated with the vehicle, and determine, based on the location of the driver and the region of interest associated with the vehicle, a misalignment of the rearview mirror. The control circuitry may also be configured to provide an alert of the misalignment to the user.

In at least some example approaches, the vehicle system further comprises a camera in communication with the control circuitry. The camera may be mounted to the rearview mirror, and the control circuitry may be configured to determine the location of the driver using the camera.

In at least some example illustrations, the vehicle system also includes one or more vehicle reference locations spaced away from the rearview mirror. The control circuitry may be configured to identify the region of interest based on an orientation of the rearview mirror relative to the one or more vehicle reference locations.

In at least some example approaches, the vehicle system also comprises a display positioned away from a reflective surface of the rearview mirror, wherein the alert includes a visual alert positioned in the display.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

In example approaches herein, vehicle systems and methods are described that provide an alert of a misalignment of a rearview mirror of a vehicle. For example, a rearview mirror may be incorrectly positioned such that when the driver looks through the mirror, their view rearward does not provide a clear view rearward of the vehicle, e.g., of other approaching vehicles, etc. A rearview mirror may also be moved from an aligned position during vehicle operation, e.g., due to the vehicle traversing bumps or other surfaces jarring the rearview mirror, being inadvertently bumped by the driver or passenger, etc.

Example systems may determine a location of the driver/user and communicate an alert to the driver when the rearview mirror is misaligned. In this manner, the driver/operator may be proactively notified when the rearview mirror is out of alignment. By providing this alert, the mirror may be adjusted before the driver requires use of the rearview mirror. By contrast, without the provided alerts the driver needs to proactively monitor the mirror position, otherwise the driver may not be aware of the misaligned mirror until use of the mirror is needed.

In some example approaches, guidance may be provided regarding correct alignment of the rearview mirror. Guidance may be provided visually, e.g., using a representation of the mirror relative to a correct position for the mirror. In one example, the guidance displays a representation of the mirror relative to a rear window of the vehicle (i.e., through which the driver observes the rear of the vehicle using the mirror). In another example, the guidance displays a representation of the user's face or an icon relative to a reference frame corresponding to the region of interest. Visual guidance provided may generally facilitate a relatively fine adjustment of the rearview mirror. Visual guidance may also give a driver or user direct feedback, e.g., via a display, audible sounds, etc. to advise the driver when the mirror is aligned for the driver. By contrast, it may be difficult for a driver to manually align a rearview mirror without such guidance, particularly if a driver is already driving or otherwise has limited time or attention.

In at least some examples, a location of the driver may be perceived visually, e.g., by a camera, infrared camera, or the like. For example, a camera may be mounted to the rearview mirror. The system may compare the determined location of the driver/user with a desired location, e.g., by comparing the location of the driver with a region of interest based upon positioning/orientation of the rearview mirror.

Figure 1:
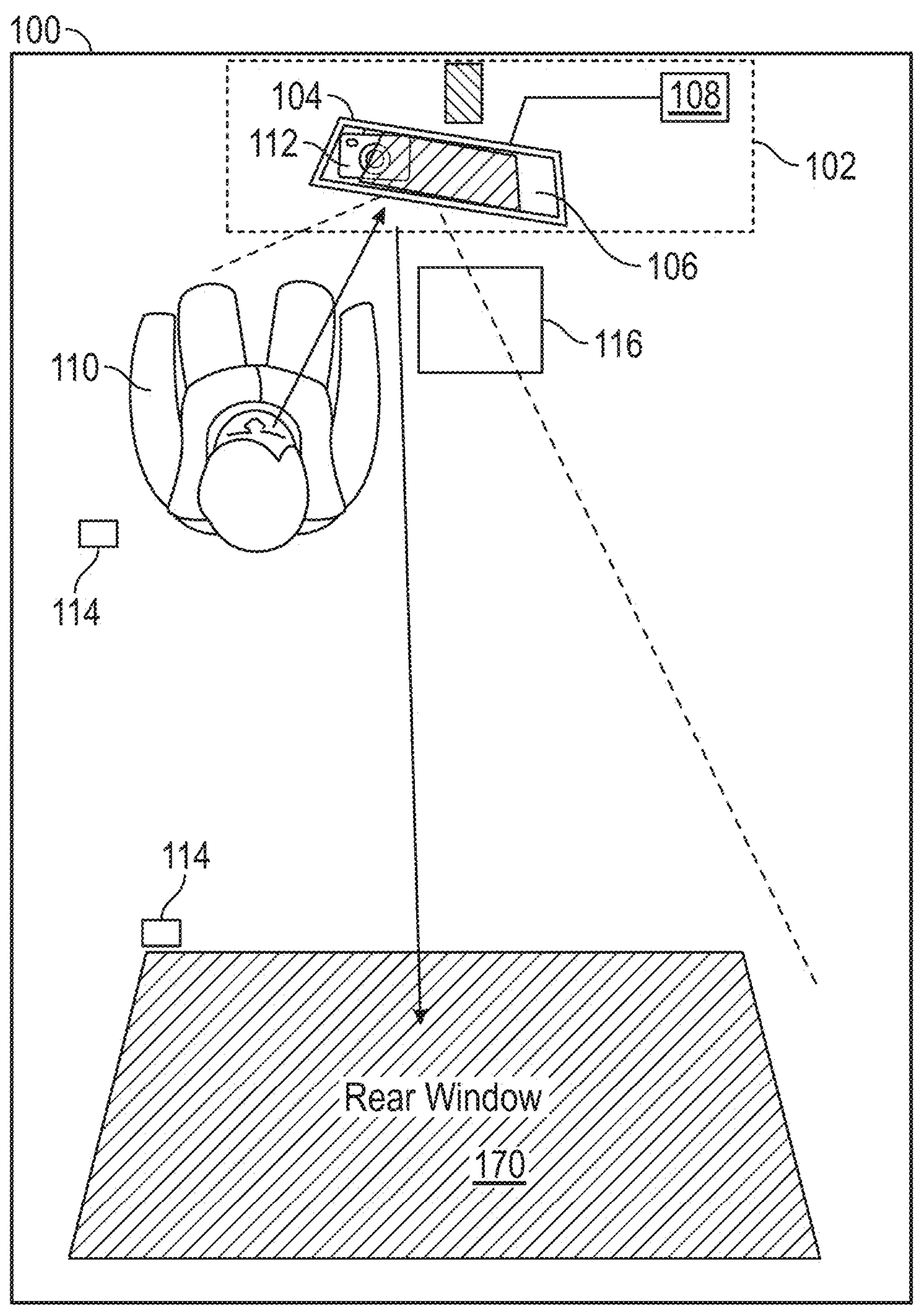
FIG. 1 illustrates an example vehicle having an alignment system for a rearview mirror, in accordance with some disclosed embodiments.

Referring now to FIG. 1, an example vehicle 100 is illustrated having an alignment system 102. In the alignment system 102, a rearview mirror 104 is provided having a mirrored or otherwise reflective surface 106 for a user 110 such as a driver to view rearward of the vehicle 100. As illustrated, the rearview mirror 104 is an inside rearview mirror of the vehicle 100, e.g., mounted to the vehicle 100 on or adjacent a front windshield. Accordingly, while operating or driving the vehicle 100, the user 110 may generally view areas in front of the vehicle 100 while also being able to see areas generally behind the vehicle 100 via the rearview mirror 104. Further, the user 110 may generally do so without having to turn their head away from the front windshield to an extent they are unable to see forward of the vehicle 100 in their peripheral vision. While examples herein are generally directed to inside rearview mirrors as illustrated in FIG. 1, the example approaches herein may be generalized and applied in the context of an outside rearview mirror as well.

The rearview mirror 104 may generally remain in a fixed position within the vehicle 100, e.g., via a mounting on a front windshield, interior roof, instrument panel, etc. The mounting may generally have a fixed position within the vehicle 100, while allowing the rearview mirror 104 to be tilted and/or rotated with respect to the mounting. Accordingly, the mounting may facilitate positioning of the rearview mirror 104 in a wide variety of positions to allow different sized users of the vehicle 100 to place the rearview mirror in an aligned position with respect to a given user.

Generally, it is desired that the rearview mirror 104 is oriented or angled within the vehicle such that the user 110 can see straight to the rear of the vehicle 100 from a normal driving position. In this manner, the rearview mirror 104 is "aligned" with respect to the user 110 for purposes of this disclosure. For example, as seen in FIG. 1, the view of the user 110 of the rear window 170 is generally centered in the reflective surface 106 of the rearview mirror 104. Should the user 110 reposition themselves within the vehicle, e.g., by changing a position of their seat within the vehicle 100, or should another user having a different height/size than the user 110 use the vehicle 100, it may be necessary to reposition the rearview mirror 104 to an aligned position in which the proper view rearward of the vehicle 100 is provided via the rearview mirror 104 (e.g., with the rear window 170 centered within the reflective surface from the viewpoint of the user 110).

The alignment system 102 may be configured to detect a misalignment of the rearview mirror 104, and to provide an alert of the misalignment and/or to provide guidance to the user 110 regarding how to align the rearview mirror 104. As will be described further below, control circuitry 108 of the vehicle 100 is configured to determine a misalignment of the mirror 104 based on a location of user 110 and a region of interest associated with a vehicle 100. Further, the alignment system 102 may provide an alert of the misalignment to the user 110. Alerts may be provided via a display 116 of the vehicle 100. The display 116 may be positioned in an instrument panel or main display area of the vehicle 100. Accordingly, alerts displayed on the display 116 are positioned away from the rearview mirror 104, and as such may be perceived by the user 110 without looking at the rearview mirror 104 and/or the reflective surface 106. Put another way, the alert(s) may be perceived visually beyond the reflective surface 106, or through audible or haptic feedback, thereby facilitating the perception of the alert by the user 110 without looking at the reflective surface 106. Visual alerts may be provided in any manner that is convenient, such as example illustrations described further below. Additionally, alerts need not be displayed and may take other forms or configurations, either alternatively or in addition to visual/displayed alerts. Merely by way of example, alerts may be audible or haptic alerts that are heard or felt by the user 110 and/or other occupants of the vehicle 100.

In some example approaches, the alignment system 102 and/or vehicle 100 may provide guidance regarding positioning of the rearview mirror 104 to an aligned position, e.g., in response to a determination that the rearview mirror 104 is misaligned. For example, as will be described further below, visual guidance may be provided that indicates a direction the user 110 should move or tilt the rearview mirror 104, e.g., up, down, left, right, or any combination thereof, thereby moving the rearview mirror 104 to an aligned position.

The alignment system 102 may also include a camera 112 in communication with the control circuitry 108. The camera 112 may be mounted to the rearview mirror 104 or otherwise configured to determine an orientation of the rearview mirror 104. For example, to the extent camera 112 is not mounted to the rearview mirror 104, an additional sensor such as an orientation sensor may be provided in the rearview mirror 104. Alternatively, camera 112 may be configured to capture at least a portion of the rearview mirror 104 in collected image data, facilitating determination of the positioning of the rearview mirror 104 based upon the image data. The camera 112 may be configured to determine the location of the user 110 in any manner that is convenient. In an example approach, the camera 112 collects image data of the user 110 that may be used to determine whether the rearview mirror 104 is aligned. The alignment system 102 may use other data or information, e.g., a location and/or orientation of the camera 112 and/or the rearview mirror 104. As will be described further below, in some examples the control circuitry 108 may be in communication with the camera 112, and may determine whether the rearview mirror 104 is aligned for the user 110 based on one or more or, and in some cases all of, the image data collected by the camera 112, the location of the camera 112 and/or rearview mirror 104, and the orientation of the camera 112 and/or rearview mirror 104.

The alignment system 102 may also include one or more vehicle reference points or reference locations 114 that may be used to assist in determining an orientation of the camera 112 and/or the rearview mirror 104, as well as a location of the user 110. For example, image data collected using the camera 112 may identify a position of one or more of the reference locations 114 within a collected image. The reference location(s) 114 may be any marker, known location, region, or other reference position that is within the field of view of the camera 112. While the reference location(s) 114 are illustrated as a box, other shapes or features may be employed. Moreover, in some examples the reference location(s) 114 may be a dimensionless point in or on the vehicle. The reference location(s) 114 may be an existing structure within the vehicle cabin, such as a seat, headrest, pillar, or headliner, merely as examples. The reference location(s) 114 may also be separate markers that are added or installed within the vehicle cabin, e.g., on a vehicle pillar or headliner. In some examples, the separate markers may not be visible to the naked eye. For example, where camera 112 is an infrared (IR) camera, the reference location(s) 114 may be IR markers that are visible only via the infrared camera 112. The reference location(s) 114 may have a fixed position within an interior of the vehicle 100, which may be known to the control circuitry 108 such that an orientation of the camera 112 and/or rearview mirror 104 may be determined. The reference location(s) 114 may be spaced away from the rearview mirror 104. Control circuitry 108 may thereby determine an orientation of the rearview mirror 104, e.g., an angle at which the rearview mirror 104 is positioned relative to the vehicle, to a horizontal, vertical, or lateral reference, or the like. As will be described further below, control circuitry 108 may determine a region of interest based on an orientation of the mirror 104 relative to the one or more vehicle reference locations 114. The region of interest may be a location within image data collected by camera 112 in which the eyes of the user 110 must be positioned to have a clear view to the rear of the vehicle 100, given the position and/or orientation of the camera 112 and/or rearview mirror 104.

In some examples, the alignment system 102 may be a driver monitoring system (DMS) of the vehicle 100, or part of a driver monitoring system of the vehicle 100. In an example, a DMS may generally be configured to monitor driver or operator behavior, attentiveness, etc. In some examples, the DMS may provide notifications or alerts in response to conditions indicating potential driver inattentiveness. For example, camera 112 may be used to determine a direction in which the eyes of the user 110 are directed, and the DMS may provide a prompt or alarm in response to a detection that user 110 has looked away from the area in front of the vehicle 100 for a predetermined amount of time. Accordingly, the DMS may prompt user 110 to maintain attention to driving tasks such as looking ahead of the vehicle 100. The camera 112 may be used by the DMS to capture image data or video of a cabin inside the vehicle 100, e.g., to monitor the attentiveness of the user 110.

Figure 2:
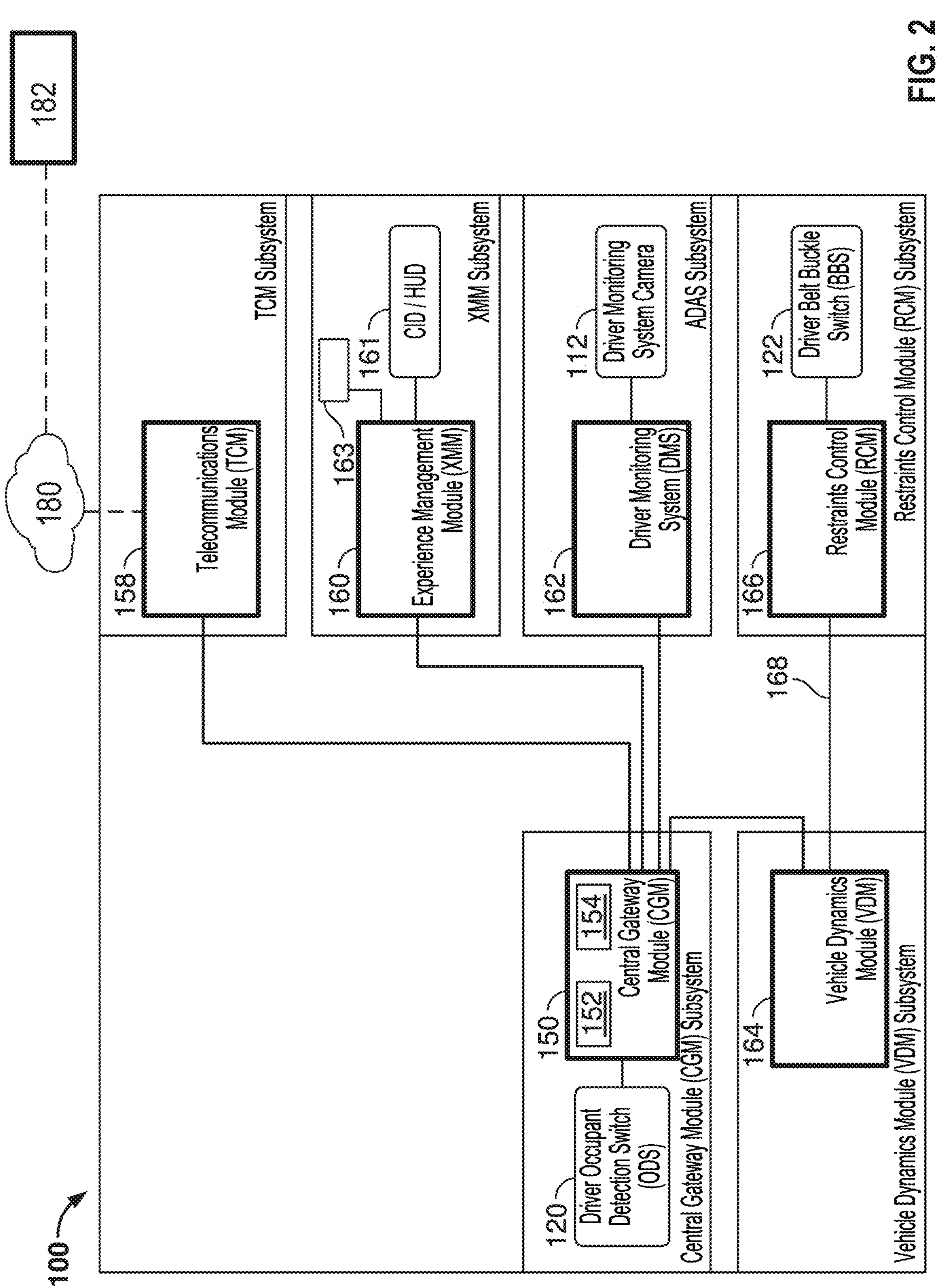
FIG. 2 illustrates a schematic view of the vehicle of FIG. 1, in accordance with some disclosed embodiments.

Referring now to FIG. 2, a schematic illustration of the vehicle 100 described above in FIG. 1 is illustrated and described in further detail. The vehicle 100 may include a central gateway module (CGM) 150 comprising a processor 152 and a memory 154. The memory 154 may be any computer-readable storage medium or the like and may have instructions stored therein which may cause the processor 152 to undertake various steps of example methods described herein. The central gateway module 150 may be configured to monitor various conditions described herein, e.g., relating to monitoring alignment of the rearview mirror 104 and/or camera 112.

The central gateway module 150, as illustrated in FIG. 2, may be communicatively linked with a plurality of vehicle modules. The central gateway module 150 and other modules discussed herein may be separate entities, e.g., with different processors/memories, or may be integrated together and/or within other controllers or modules of the vehicle 100, including but not limited to a body control module, vehicle control module, powertrain control module, etc.

In the example illustrated in FIG. 2, the central gateway module 150 communicates with a telecommunications module (TCM) 158, an experience management module 160, a driver monitoring system module (DMS) 162, and a vehicle dynamics module (VDM) 164 via a vehicle bus, communication hub or network, e.g., an ethernet. The control circuitry 108 may be implemented as or as part of the driver monitoring system 162. However, in example approaches control circuitry 108 may be split across different modules, subsystems, etc. Merely by way of example, control circuitry 108 may be implemented as part of the DMS 162 and the experience management module 160. The telecommunications module 158 may be configured to facilitate communication of the vehicle 100 and/or components thereof with external entities via an external communications network 180. Merely by way of example, the telecommunications module 158 may allow service personnel of a central office 180 (e.g., of a manufacturer or fleet operator of the vehicle 100) to communicate with vehicle 100, initiate software updates, collect data associated with vehicle 100 and operation thereof, etc. Accordingly, the network 180 may include any network for communication without limitation, e.g., the internet, a cellular data network or other communication network, etc. The vehicle 100 may communicate data externally of the vehicle 100 to the central office 180. Data received from the vehicle 100, as well as other vehicles associated with the central office 180, may be collected and/or stored at the central office 180, e.g., for analysis and/or action by the central office 180 or fleet operator.

The experience management module (XMM) 160 is in communication with one or more displays 161 of the vehicle 100, e.g., a center information display (CID), a heads-up display (UD), additional screens or displays, etc. In an example, the display(s) 161 include display 116. The experience management module 160 may also be linked with speakers 163 of the vehicle 100. Accordingly, experience management module 160 may facilitate display of visual or audible alerts and/or guidance generated by the central gateway module and/or other modules of the vehicle 100. For example, as discussed further below, the driver monitoring system 162 may provide notifications, such as audible or visual alerts to user 110 of the misalignment of the rearview mirror 104 and/or camera 112, and/or guidance configured to assist the user 110 in aligning the rearview mirror 104. The driver monitoring system 162, as noted above, may be configured to monitor the user 110 of the vehicle, e.g., with respect to proper positioning of the user 110 within the cabin, attentiveness of the driver, or any other aspects that may be convenient. In the illustrated example, the driver monitoring system 162 is communicatively linked with the camera 112 at least to monitor alignment of the rearview mirror 104.

Driver monitoring system 162 may be in communication with additional modules and/or sensors of vehicle 100. For example, driver monitoring system 162 may be communicatively linked with a restraints control module (RCM) 166 via the central gateway module 150, which is communicatively linked to the restraints control module 166 via a controller area network (CAN) 168 of the vehicle 100. The CAN 168 may generally facilitate communication of the vehicle dynamics module 164, restraints control module 166, and other controllers, electrical components, and/or subsystems (not shown) of the vehicle 100. The restraints control module 166 may be communicatively linked with, for example, a seat belt buckle switch (BBS) or other sensor 122, such that the restraints control module 166 is configured to provide information regarding whether/when a buckle of a seat belt used by the user 110 is positively engaged, indicating that user 110 is in the vehicle 100, is driving, etc. The driver monitoring system 162 may be part of or included in an Advanced Driver Assistance System (ADAS). Merely by way of example, the ADAS may generally facilitate mapping or guidance of the vehicle 100. In at least some examples, the ADAS provides autonomous or semi-autonomous guidance of the vehicle 100, e.g., by controlling speed and/or steering of the vehicle 100.

The central gateway module 150 may be in communication with one or more sensor(s) of the vehicle 100, and thus may be configured to monitor conditions associated with determining alignment of the rearview mirror 104, presence of the user 110, etc. In the example illustrated in FIG. 2, an occupant detection switch (ODS) 120 in a driver's seat of the vehicle 100 is communicatively linked with the central gateway module 150. As noted above, the driver belt buckle switch 122 may be linked with the central gateway module 150 via the restraints control module 166, and the camera 112 may be linked with the central gateway module 150 via the driver monitoring system module 162.

Figure 3:
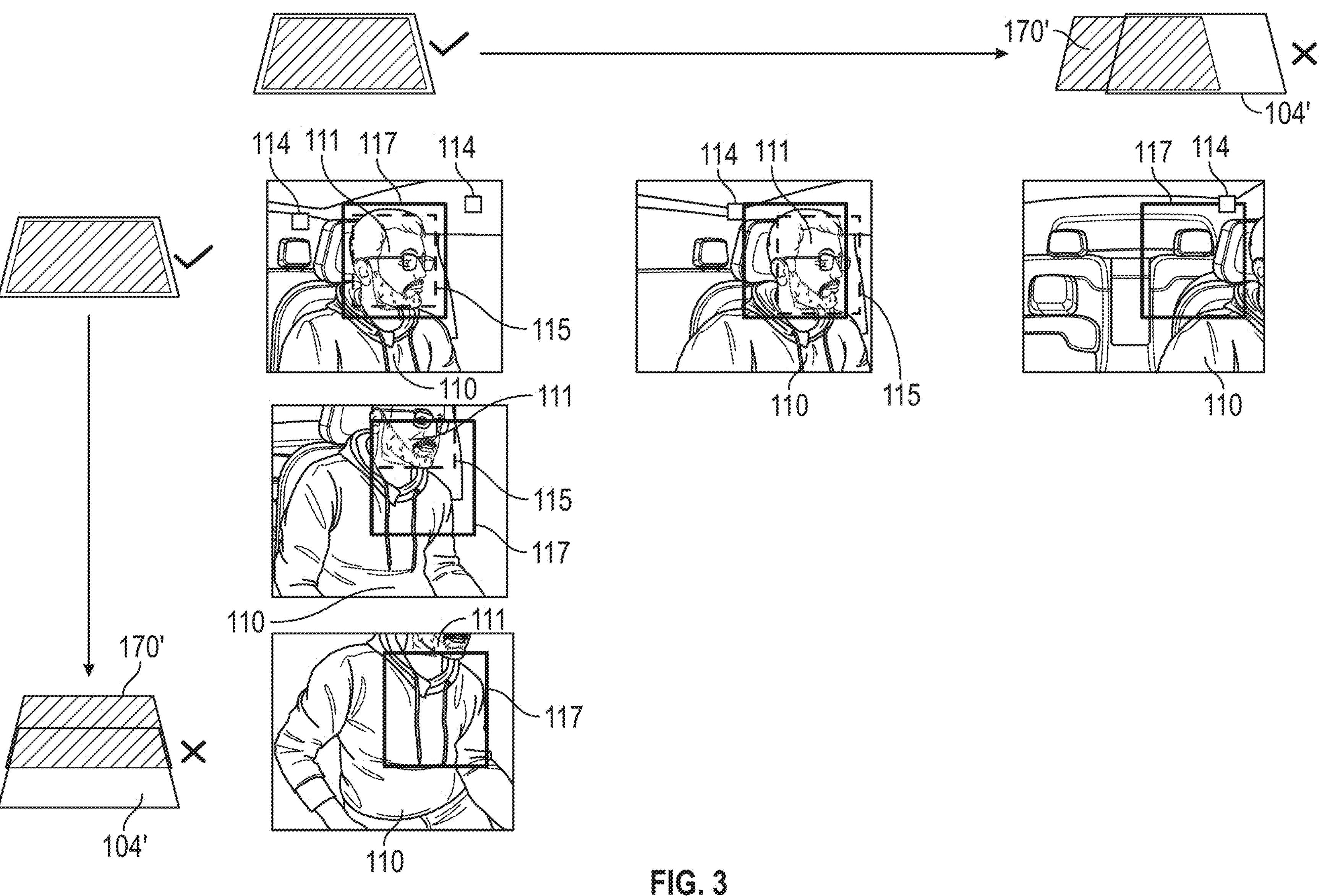
FIG. 3 illustrates example image data collected by a camera of an alignment system, in accordance with some disclosed embodiments.

Turning now to FIG. 3, example images included in image data collected by camera 112 are illustrated and described in further detail. As noted above, camera 112 may collect images of user 110 within the vehicle 100 to determine whether rearview mirror 104 is aligned, given a position of the user 110 as detected by the camera 112. As the user 110 aligns the rearview mirror 104 for vision through a rear window 170 of the vehicle 100, alignment system 102 will generally attempt to establishing a position of a face 111 of the user 110 within a defined region of interest in the corresponding image data collected by the camera 112. If the rearview mirror 104 is not aligned, based on the localization or determined position of the face 111 of the user 110, the alignment system 102 can generate an alert and/or guidance. In the example images illustrated in FIG. 3, the uppermost image on the left side reflects a generally aligned positioning of the rearview mirror 104, i.e., for the user 110 to have a clear view through the rear window 170. The images to the right along the upper portion of FIG. 3 reflect increasing misalignment where the mirror is progressively angled too far to the right of the user 110, resulting in the face 111 of the user being shown in the images on the right side of the region of interest 117 within the image, and in the case of the right-most image being out of the region of interest 117. Similarly, the images down the left side of FIG. 3 reflect progressively further-misaligned positions of the rearview mirror 104 due to the rearview mirror being aimed too low relative to the user 110, causing the user 110 to appear in an upper portion of or above the region of interest 117 in the image. Additionally, illustrative graphics are provided along the top and left side of FIG. 3 reflecting example visual guidance responsive to the misalignment indicated by the images, as will be discussed further below. In the examples illustrated, a representation of the rearview mirror 104' is shown relative to a representation of the rear window 170'. Further, the guidance may be responsive to the misalignment indicated by the images. For example, the guidance provided above the image in the upper-right area of FIG. 3 indicates that the rearview mirror 104 should be moved to the left, i.e., to bring the representation of the rearview mirror 104' closer to the representation of the rear window 170', thereby correcting the misalignment shown, i.e., the too-far-rightward aim of the rearview mirror 104. Similarly, illustrative graphics provided along the left side of FIG. 3 provide example visual guidance to correct the too-far-downward aim of the rearview mirror 104, i.e., to move the mirror upward to bring the representation of the rearview mirror 104' closer to the representation of the rear window 170'. As the rearview mirror 104 is moved to the aligned position (represented in the image at the upper-left of FIG. 3), the representation of the rearview mirror 104' overlaps the representation of the rear window 170'.

Alignment system 102, as noted above, may generally identify a region of interest associated with the vehicle in image data collected by the camera 112. The region of interest may be identified in image data based upon a position of the rearview mirror 104 within the vehicle 100 relative to typical position(s) of the user 110. The region of interest 117 may be in any position within the image that is convenient. In the examples illustrated in FIG. 3, the region of interest 117 is generally centered within the images when the rearview mirror 104 and/or camera 112 are positioned such that the user 110 has a clear view through the rear window 170 of the vehicle 100 (i.e., as represented in the uppermost image on the left side of FIG. 3). It should be noted that in other configurations of vehicle 100, other positions of user 110 in the vehicle, etc., the region of interest for image data may be different. For example, vehicle 100 is illustrated as a left-hand drive vehicle, and the region of interest will be positioned differently in a right-hand drive vehicle. Accordingly, the example region of interest illustrated may appear differently for other vehicles, configurations, orientations of camera 112, users, etc. In the illustrated example, an aligned position of the rearview mirror 104 relative to the user 110 will result in the camera 112 "seeing" the user 110 in the region of interest 117.

Generally, image data collected (e.g., by camera 112) may be used to identify a location of the face 111 of the user 110 in any manner that is convenient. The collection of images by camera 112 illustrated in FIG. 3, and an example process for identifying a location of a user 110 is described in further detail. In an example, alignment system 102 establishes a bounding box 115 to identify face(s) present in an image. For example, one or more trained models may be stored in driver monitoring system 162, e.g., in a memory thereof, and may be utilized by control circuitry 108 of the vehicle to analyze one or more images and identify bounding box(es) corresponding to face(s) 111 in the image(s). Collected images may identify bounding boxes 115 in different areas of a two-dimensional image based upon an orientation of the camera 112 and/or the rearview mirror 104, and the location of the user 110. Additionally, the position of the bounding box 115 (or other indication of a location of the user 110) may be compared with a region of interest, as will be described further below to determine whether the rearview mirror 104 is aligned. The bounding box 115 may be a minimum area bounding box that generally defines a minimum area enclosing one or more relevant features of the user 110 (e.g., one or more facial features such as the eyes, nose, chin, forehead, etc. of the user 110). While bounding boxes have been described above for use to determine a location of a face 111 of the user 110, other bounding shapes and/or facial recognition methodologies may be employed. Merely as examples, a circle, ellipse, or three-dimensional bounding box may be employed. In an example, a location of a user can be defined as a bounding box, circle, ellipse, a three-dimensional bounding box or an image segmentation mask. The bounding shape may then be compared with a region of interest, e.g., region of interest 117. While the region of interest 117 is illustrated being slightly larger than the bounding box 115 in FIG. 3, it should be noted that the region of interest 117 may in at least some examples be a same size and shape as the bounding box 115. A bounding box may, in an example, be defined as a box as defined by coordinates of a top left point (x1,y1), and a bottom right point (x2, y2), or alternatively may be specified as a box based upon a specified centerpoint (cx cy) and a width (w) and a height (h) of the box. In examples employing bounding box or other bounding shapes, a location of a user of the rearview mirror 104 as determined by the location of the bounding box 115 may be compared with a region of interest 117 using an Intersection over Union (IoU) calculation. More specifically, an intersection may be defined as an area of overlap between the bounding box 115 and the region of interest 117, with the union being defined as the sum of the areas of the bounding box 115 and the region of interest 117, less any overlap between the bounding box 115 and the region of interest 117. The IoU calculation may be the intersection divided by the union. Relatively higher IoU measurements may indicate the rearview mirror 104 is more aligned. In the example illustrated in the top left of FIG. 1, the intersection over union score is 0.95. By contrast, the top-middle image in FIG. 3 has an IoU score of 0.1 (resulting from the relatively shifted position of the bounding box 115). As further contrast, the top-right image in FIG. 3 has an IoU score of 0.0, as a result of the bounding box 115 being off-image due to the position of the user 110. Further, in addition to a location of the user 110, an orientation of the face 111 and/or head of the user 110 may also be determined. For example, the camera 112 may identify a relative positioning of facial features of the user 110, e.g., a position of the chin and/or nose of the user 110 relative to the eyes, etc. Further, while the examples herein are directed to detecting location of a face 111 and/or eyes of the user 110, other characteristics of the user 110 may be detected alternatively or in addition.

The alignment system 102 may also determine an orientation or positioning of the rearview mirror 104, as noted above. Image data collected by the camera 112 may also be employed in this respect. For example, one or more reference locations 114 may be established within the vehicle interior of the vehicle 100. Any visual cue or characteristic of an interior of the vehicle 100 may be used in this respect, e.g., seats, windowpanes, etc. to localize the location of the mirror for finer refinement. Additionally, explicit visual markers, e.g., infrared markers, can be installed in the interior of the vehicle 100 as reference locations 114, and/or to assist learning and computer vision modules of control circuitry 108.

Alternatively or in addition to visual/image data collected by camera 112 or other sensor(s) of the vehicle 100, the alignment system 102 may use additional sensors to determine an orientation or position of the rearview mirror 104. In an example, a pair of inertial measurement units (IUs) positioned in the rearview mirror 104 may be employed to triage a position of the rearview mirror 104 with respect to the user 110, and/or with respect to the rear window 170 of the vehicle 100.

Figure 4A:
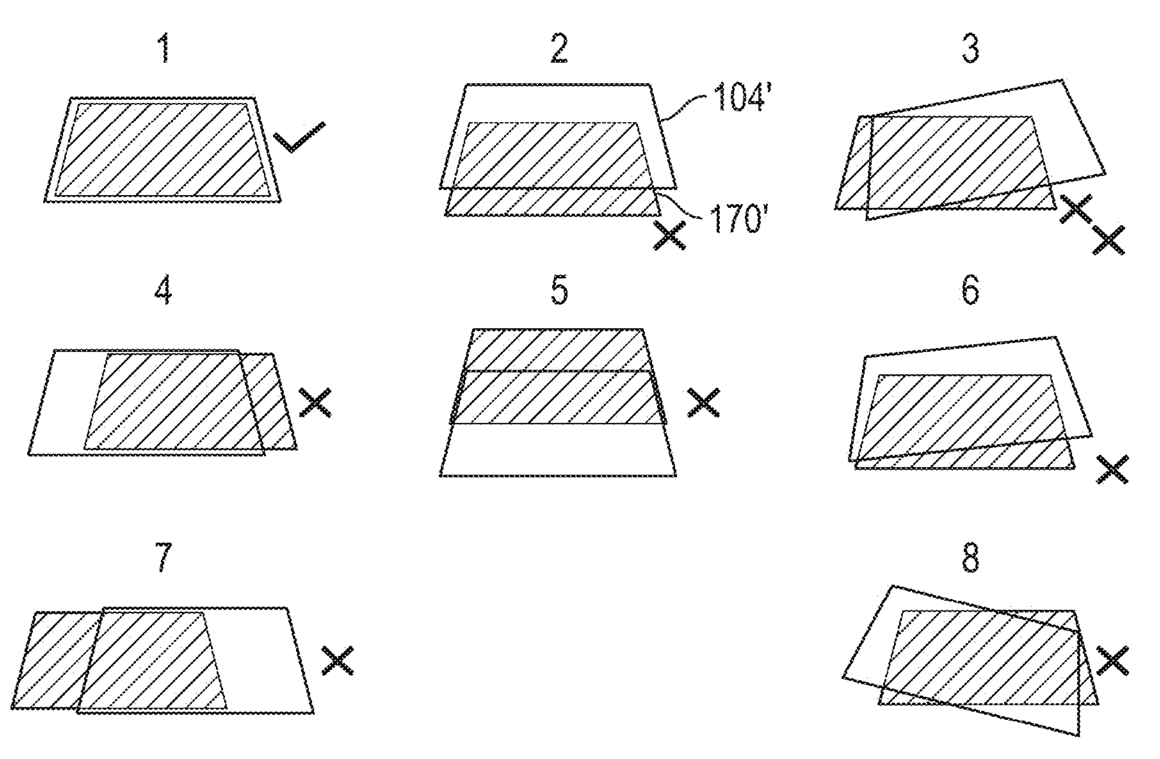
FIG. 4A illustrates visual guidance provided by an alignment system, in accordance with some disclosed embodiments.
Figure 4B:
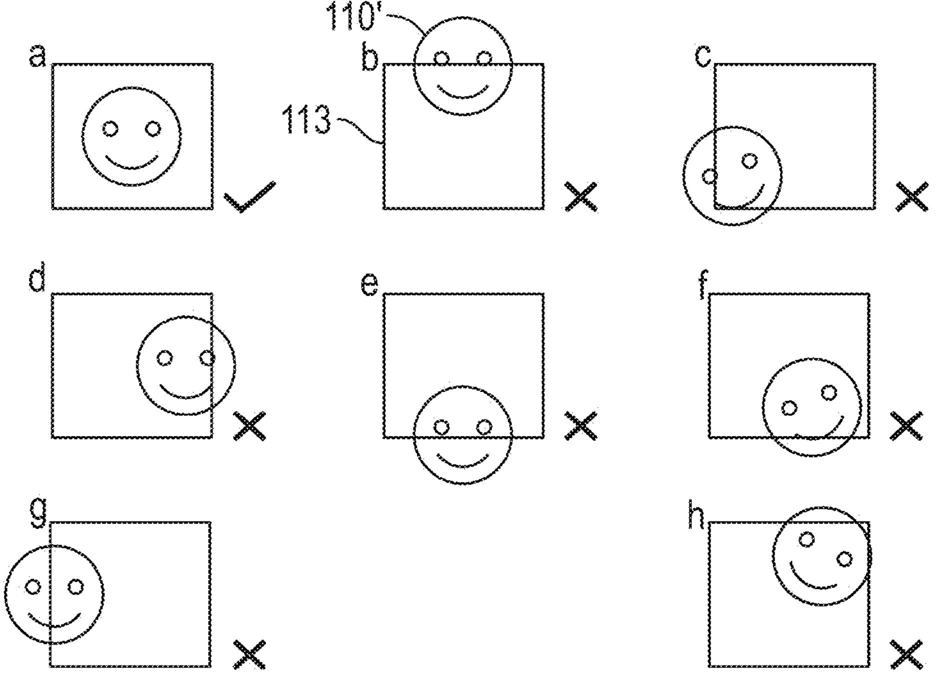
FIG. 4B illustrates another example of visual guidance provided by an alignment system, in accordance with some disclosed embodiments.

Turning now to FIGS. 4A and 4B, example illustrations of visual guidance that may be provided by the alignment system 102 are illustrated and described in further detail. In a first example illustrated in FIG. 4A, visual guidance provides a visual representation of the rearview mirror 104 as well as rear window 170 and displays a relative alignment between each in real time as the user 110 manipulates the rearview mirror 104. In view 1, an aligned position is illustrated showing the representation 104' of the rearview mirror 104 surrounding that of the representation 170' of the rear window 170. The views 2-8 each illustrate the representations 104' and 170' being misaligned, with the manner of the misalignment being illustrated by relative positioning of the representations 104' and 170'. In this manner, the user can "see" in real time how the rearview mirror 104 should be moved, e.g., which direction it should be tilted, to align the mirror for the user 110. In another example illustrated in FIG. 4B, a representation 110' of a face 111 of the user 110 is shown relative to a box 113. The box 113 is illustrated being aligned around the representation 110' in example a, indicating the rearview mirror 104 is aligned for the user 110. By contrast, the box 113 is illustrated in examples b-h to represent how the rearview mirror 104 is misaligned by displaying the box 113 and the representation 110' offset, thereby indicating which direction(s) the user 110 should tilt the rearview mirror 104 to bring the rearview mirror 104 into alignment. As noted above, visual guidance such as those provided in the examples in FIGS. 4A and 4B may be provided by way of display 161 of the vehicle 100.

Generally, rearview mirror 104 or an outside rearview mirror may be moved to or toward an aligned position in any manner that is convenient. In some examples, mirror(s) may be manually grasped by a driver or user and tilted by hand. In other examples, mirror(s) may be moved via actuators controlled via a user interface of the vehicle, e.g., the display 116. Furthermore, to the extent actuators of mirror(s) can also be controlled directedly by the vehicle and/or control circuitry of the vehicle, the control circuitry may generally align the mirror(s) automatically too without any manual adjustment, e.g., based on the detected location of user and/or region of interest. In such examples, geometry of the vehicle and cabin may be known, as well as relative position(s) of each mirror being controlled or aligned. In an example, positions of the outside rearview mirrors (e.g., a driver's side mirror and a passenger-side mirror) with respect to an inside rearview mirror (e.g., rearview mirror 104) may be known based on the fixed geometry of the vehicle/interior. Once the location of a user is determined with respect to the rearview mirror 104, alignment of the outside rearview mirrors can be estimated, and alignment guidance can be provided.

Figure 5:
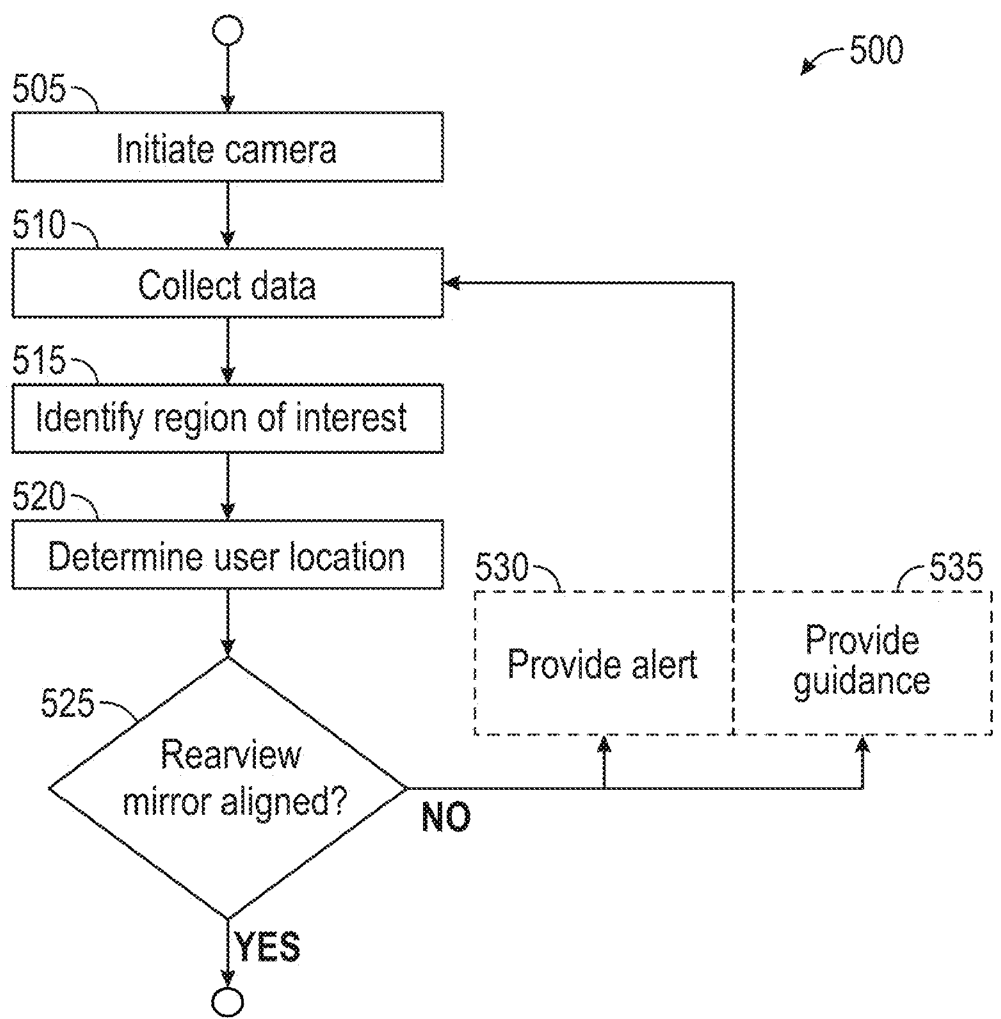
FIG. 5 illustrates an example method for aligning a rearview mirror; in accordance with some disclosed embodiments.

Turning now to FIG. 5, an example process 500 for determining an alignment of a rearview mirror, e.g., rearview mirror 104, is illustrated and described in further detail. Process 500 may begin at block 505, where operation of a camera associated with a rearview mirror, e.g., camera 112, is initiated. Operation of the camera 112 may be initiated, e.g., when vehicle 100 is started or powered on, or when an event occurs causing driver monitoring system 162 to determine whether the rearview mirror 104 is aligned. Merely by way of example, in some cases vehicle 100 and/or driver monitoring system 162 may be configured to detect that a position of the user 110 has changed, e.g., by adjusting a position of the driver seat, entering the vehicle, etc. Accordingly, process 500 may initiate operation of the camera 112 to collect image data.

Proceeding to block 510, process 500 may collect image data using the camera 112, as well as other data collected from other sensors that may be employed by alignment system 102 to determine alignment of the rearview mirror 104. To the extent the camera 112 may need periodic calibration, the camera 112 may be calibrated prior to collection of image data. As noted above, camera 112 may collect image data to determine one or both of a location of user 110, and an orientation/position of the rearview mirror 104. Alternatively, or in addition, data may be collected using other sensors of the vehicle 100 to determine a location of the user 110, or an orientation of the rearview mirror 104, for example. Process 500 may then proceed to block 515.

At block 515, a region of interest may be identified associated with vehicle 100. For example, based on a location and/or orientation of the rearview mirror 104, alignment system 102 may identify a region within two-dimensional image data collected by camera 112 where user 110 generally must be positioned to have a clear view to the rear of the vehicle 100 via the rearview mirror 104. The region of interest may be identified, e.g., based upon an orientation of the rearview mirror 104 as indicated based on one or more of the images taken by camera 112 and/or one or more of the vehicle reference locations 114. As noted above, reference locations 114 may in some examples have a fixed position relative to a mount of the rearview mirror 104, e.g., by way of being fixed to an interior location within the vehicle 100. Accordingly, the reference location(s) 114 generally have a fixed relationship in space with respect to the rearview mirror 104 that may be used in determining an orientation of the rearview mirror 104 and/or identifying a region of interest.

Proceeding to block 520, process 500 may determine, e.g., using control circuitry 108, a location of a user of a rearview mirror (e.g., a driver of a vehicle). For example, as described above the location of the user may be determined from one or more facial features of the user. Additionally, the location of the user may be determined by establishing or determining a bounding box surrounding facial features of the user 110.

Proceeding to block 525, process 500 may determine whether the rearview mirror is aligned. For example, control circuitry 108 may determine whether the rearview mirror is aligned based on the location of the user and the region of interest. More specifically, control circuitry 108 may compare the location of the user determined at block 520 with the region of interest identified at block 515 to determine whether the mirror is aligned. For example, when the user location is within the region of interest, this indicates that the rearview mirror 104 is aligned for the user 110 of the vehicle 100. In some examples, rearview mirror 104 is determined to be aligned if the bounding box identifying the location of the user 110 is within the region of interest.

Where process 500 determines that the rearview mirror is aligned, process 500 may end. Alternatively, process 500 proceeds to initiate an alert at bock 530, and/or corrective guidance to align the rearview mirror 104 at block 535. It should be noted that example approaches herein may employ one of blocks 530 or 535, or both.

At block 530, process 500 may provide, e.g., using the control circuitry 108, an alert of the misalignment of the rearview mirror 104 to the user 110. As noted above, the alert may include one or both of a sound and a visual alert. Moreover, the alert(s) may be provided away from the reflective surface 106 of the rearview mirror 104. For example, the alert may be audibly played over speakers 163. In another example, a visual alert is displayed on display 161 of the vehicle 100. Accordingly, the user 110 need not be looking at the rearview mirror 104 to perceive the alert.

At block 535, process 500 may provide visual guidance to the user to align the mirror based on the misalignment. As noted above, guidance may include providing an indication of a direction in which the user 110 should move/tilt the rearview mirror 104 to move the rearview mirror 104 closer to an aligned position. The guidance may also include, as described above, a visual reference of an aligned position of the rearview mirror relative to a vehicle feature, e.g., rear window 170. In some approaches, a user interface such as display 116 may be used to move rearview mirror 104 to or toward an aligned position. Furthermore, as noted above, while examples herein are generally directed to inside rearview mirrors such as rearview mirror 104, example approaches herein may be generalized and applied in the context of an outside rearview mirror as well. In such examples, one or more of the outside rearview mirror(s) may be moved, aligned, or otherwise controlled via a same user interface, e.g., using display 116.

Process 500 may determine guidance to be provided in any manner that is convenient. In an example, the image data (e.g., as shown in FIG. 3) may be utilized to determine a distance or delta between the region of interest 117 and the bounding box 115. In a further example, a distance or delta in both horizontal ("X") and vertical ("Y") directions may be determined and may be used to indicate a degree to which the rearview mirror 104 may need to be rotated horizontally or vertically. To the extent the rearview mirror 104' becomes misaligned such that the rearview mirror 104 is rotated clockwise or counterclockwise, the reference locations 114 such as markers or other visual cues in the image data may indicate such rotational misalignment. In the example image data illustrated in FIG. 3, the two reference locations 114 may have a known elevation within the vehicle 100 relative to each other, or in some cases may be expected to be at a same vertical position in the image. To the extent an image shows one or both reference locations 114 out of their expected positions the camera 112 may be used to determine how far the reference location(s) 114 are from their respective expected position. Accordingly, process 500 may determine whether/how much a rotation of the rearview mirror 104 and the appropriate clockwise/counterclockwise direction of rotation needed. Additionally, misalignment of the rearview mirror 104 vertically (i.e., rearview mirror 104 being aimed too far up or down or laterally (i.e., rearview mirror 104 being aimed too far left/right of the user 110) may also be taken into account by the alignment system 102 and/or process 500, adjusting the needed rotation of the rearview mirror due to the rotational misalignment accordingly.

From block 530 and/or 535, process 500 may proceed to block 510 and initiate further collection of data for determining whether the rearview mirror 104 is aligned. Accordingly, process 500 generally facilitates a continuous monitoring of the alignment of the rearview mirror 104. As noted above, process 500 may also be initiated in response to detection of one or more conditions impacting alignment of the rearview mirror 104, e.g., movement of a driver's seat of vehicle 100, opening of the driver's door, or the like.

The example illustrations facilitate alignment of rearview mirror 104, thereby reducing incidences of the driver realizing while driving a vehicle that the rearview mirror requires adjustment. Moreover, example alerts and/or guidance as described herein may improve accuracy of driver monitoring systems to the extent visual monitoring of the driver relies upon proper positioning of the rearview mirror (e.g., where cameras for monitoring driver behavior are located in the rearview mirror or otherwise rely upon rearview mirror positioning).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method, comprising:

collecting, using a camera of a driver monitoring system of a vehicle, a plurality of images in real time while the vehicle is in operation;

determining, using control circuitry of the driver monitoring system, a respective bounding box based on a location of a driver of the vehicle for each of the plurality of images;

identifying, using control circuitry of an alignment system of the vehicle, a region of interest box associated with image data corresponding to the plurality of images based on an orientation of a rearview mirror of the vehicle relative to one or more vehicle reference locations;

determining, using the control circuitry of the alignment system, a misalignment of the rearview mirror based on a real time comparison of a respective bounding box of at least one image of the plurality of collected images and the region of interest box; and providing, using the control circuitry of the alignment system, an alert corresponding to the misalignment to the driver in real time using one or more of a display, a speaker, or a haptic feedback feature based on the real time comparison.

2. The method of claim 1, further comprising determining the orientation of the rearview mirror based on identifying a position of at least one of the one or more vehicle reference locations in at least one image of the plurality of images, wherein camera is coupled to the rearview mirror.

3. The method of claim 1, wherein at least one of the one or more vehicle reference locations is spaced away from the rearview mirror.

4. The method of claim 1, wherein:

at least one of the one or more vehicle reference locations has a fixed position relative to a mount of the rearview mirror; and the at least one of the one or more vehicle reference locations is spaced away from the rearview mirror.

5. The method of claim 1, wherein providing the alert comprises generating, using the display, a visual guidance to the driver to align the rearview mirror relative to a rear window of the vehicle based on the misalignment.

6. The method of claim 5, wherein the visual guidance includes a representation of a vehicle feature.

7. The method of claim 1, wherein the location of the driver is determined from one or more facial features of the driver.

8. The method of claim 1, wherein the bounding box comprises an area enclosing one or more facial features of the driver.

9. The method of claim 1, wherein determining the misalignment of the rearview mirror is performed in response to detecting a driver movement relative to the location of the driver.

10. The method of claim 1, wherein:

the alert comprises a sound played over at least one speaker; and the alert further comprises a visual alert displayed on the display, wherein the display is located away from a reflective surface of the rearview mirror.

11. The method of claim 1, further comprising:

generating, using the control circuitry of the alignment system, an overlay comprising a representation of the rearview mirror and a rear window of the vehicle based on the misalignment; and causing, using the control circuitry of the alignment system, the display to present the overlay with corrective guidance for addressing the misalignment, wherein the display is positioned in the vehicle away from a reflective surface of the rearview mirror.

12. A method, comprising:

collecting, using a camera of a driver monitoring system of a vehicle, a plurality of images in real time while the vehicle is in operation;

determining, using control circuitry of the driver monitoring system, a respective bounding box based on a location of a driver of the vehicle for each of the plurality of images;

identifying, using control circuitry of an alignment system of the vehicle, a region of interest box associated with image data corresponding to the plurality of images based on an orientation of a rearview mirror of the vehicle relative to one or more vehicle reference locations;

determining, using the control circuitry of the alignment system, a misalignment of the rearview mirror based on a real time comparison of a respective bounding box of at least one image of the plurality of images and the region of interest box; and providing, using the control circuitry of the alignment system, a visual guidance to the driver in real time to align the rearview mirror based on the misalignment, wherein the visual guidance comprises a virtual overlay comprising a representation of the rearview mirror and a rear window of the vehicle.

13. The method of claim 12, wherein identifying the region of interest box comprises determining the orientation of the rearview mirror based on identifying a position of at least one of the one or more vehicle reference locations in at least one image of the plurality of images, wherein the camera is coupled to the rearview mirror.

14. The method of claim 12, wherein the visual guidance comprises a visual reference of an aligned position of the rearview mirror relative to the rear window.

15. The method of claim 14, wherein the visual reference further comprises a visual representation of at least one vehicle feature.

16. A vehicle system, comprising:

a rearview mirror;

a camera of a driver monitoring system;

control circuitry of the driver monitoring system; and control circuitry of an alignment system, wherein the vehicle system is configured to:

collect, using the camera of the driver monitoring system, a plurality of images in real time while the vehicle system is in operation;

determine, using the control circuitry of the driver monitoring system, a respective bounding box based on a location of a driver of a vehicle comprising the vehicle system for each of the plurality of images;

identify, using the control circuitry of the alignment system, a region of interest box associated with image data corresponding to the plurality of images based on an orientation of the rearview mirror of the vehicle relative to one or more vehicle reference locations;

determine, using the control circuitry of the alignment system, a misalignment of the rearview mirror based on a real time comparison of a respective bounding box of at least one image of the plurality of images and the region of interest box; and provide, using the control circuitry of the alignment system, an alert corresponding to the misalignment to the driver in real time using one or more of a display, a speaker, or a haptic feedback featured based on the real time comparison.

17. The vehicle system of claim 16, wherein:

the camera is in communication with the control circuitry of the driver monitoring system and the control circuitry of the alignment system;

the camera is mounted to the rearview mirror; and the control circuitry of the driver monitoring system is configured to determine the location of the driver based at least in part on one or more bounding boxes determined for one or more of the plurality of images.

18. The vehicle system of claim 16, wherein the one or more vehicle reference locations is spaced away from the rearview mirror.

19. The vehicle system of claim 16, wherein:

the display is positioned away from a reflective surface of the rearview mirror; and the alert includes a visual alert positioned in the display.

* * * * *